G. SIMMONDS.
LAMP.

No. 192,294. Patented June 19, 1877.

Witnesses
W. R. Edelin.
Alex Abraham.

Inventor
George Simmonds.
by Lewis Abraham,
atty.

UNITED STATES PATENT OFFICE.

GEORGE SIMMONDS, OF SAN FRANCISCO, CALIFORNIA.

IMPROVEMENT IN LAMPS.

Specification forming part of Letters Patent No. 192,294, dated June 19, 1877; application filed March 9, 1877.

*To all whom it may concern:*

Be it known that I, GEORGE SIMMONDS, of of the city of San Francisco, in the county of San Francisco and State of California, have invented a new and useful Improvement in Chamber and Nursery Lamps, which improvement is fully set forth in the following specification and accompanying drawing.

The object of my invention is to furnish a device for a nursery or chamber light without the use of a wick.

Figure 1:
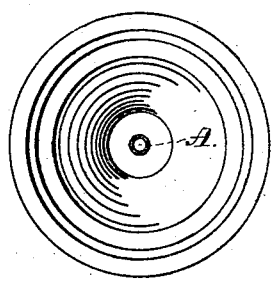
Figure 2:
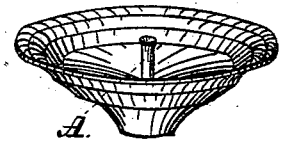
Figure 3:
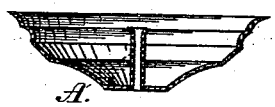

Figure 1 is a top view of a bowl or cup having in the center a small perpendicular tube, A. Fig. 2 is a perspective view of the same. Fig. 3 is a sectional view of the bowl, with the central upright tube A.

My device consists of a thin hollow cup or bowl pierced in the center with a small circular hole, into which is adjusted, hermetically, a small upright tube, the upper end of which terminates at a point somewhat below the plane of the upper periphery of the bowl.

The operation and use of my device is as follows: Into a tumbler or other reservoir is poured a suitable quantity of non-explosive oil, upon which the bowl is gently placed, so that it will float. A light is then applied to the upper opening of the tube A, and in a short time the oil that has risen therein will ignite and remain lighted until the whole quantity of oil is consumed, or until the flame is intentionally extinguished, or until the apparatus is accidentally overturned, in which latter case the light will of itself go out. The bowl is made preferably of metal, and the tube preferably of glass; but I do not desire to limit myself alone to making my apparatus of these specific materials.

Having thus described my invention, what I claim is—

1. The hollow bowl, with its central short tube A, substantially as shown and described.
2. A wickless chamber or nursery light, consisting of an open reservoir of oil, supplied with a floating bowl, having in its center a small short tube, A, substantially as shown and described.

GEORGE SIMMONDS.

Witnesses:
 FRANK V. SCUDDRO,
 P. SIMMONDS.